US006328766B1

(12) United States Patent
Long

(10) Patent No.: US 6,328,766 B1
(45) Date of Patent: Dec. 11, 2001

(54) MEDIA ELEMENT LIBRARY WITH NON-OVERLAPPING SUBSET OF MEDIA ELEMENTS AND NON-OVERLAPPING SUBSET OF MEDIA ELEMENT DRIVES ACCESSIBLE TO FIRST HOST AND UNACCESSIBLE TO SECOND HOST

(75) Inventor: Robert M. Long, San Diego, CA (US)

(73) Assignee: Overland Data, Inc., San Diego, CA (US)

( * ) Notice: Subject to any disclaimer, the term of this patent is extended or adjusted under 35 U.S.C. 154(b) by 0 days.

(21) Appl. No.: 09/104,406

(22) Filed: Jun. 25, 1998

Related U.S. Application Data

(63) Continuation-in-part of application No. 08/786,702, filed on Jan. 23, 1997, now abandoned.

(51) Int. Cl.[7] ............................. G06F 12/14; G06F 12/00; G06F 13/00; G11B 17/22; G11B 15/00
(52) U.S. Cl. .................. 718/8; 710/15; 710/17; 710/36; 710/104; 711/4; 711/111; 711/152; 711/163; 369/34; 369/36; 369/56; 360/69; 360/131; 360/134
(58) Field of Search ..................................... 710/100, 129, 710/8, 9, 15, 17, 36, 104; 711/4, 111, 112, 114, 152, 163; 360/69, 92, 93, 131, 132, 134; 369/34, 36, 56, 191, 192

(56) References Cited

U.S. PATENT DOCUMENTS

| 5,164,909 | * | 11/1992 | Leonhardt et al. ............. 364/478.03 |
| 5,303,214 | * | 4/1994 | Kulakowski et al. ................. 369/34 |
| 5,386,545 | | 1/1995 | Gombos, Jr. et al. . |
| 5,502,811 | | 3/1996 | Ripberger . |
| 5,502,836 | | 3/1996 | Hale et al. . |
| 5,511,177 | | 4/1996 | Kagimasa et al. . |
| 5,530,850 | | 6/1996 | Ford et al. . |
| 5,594,922 | * | 1/1997 | Suzuki et al. ........................... 710/17 |
| 5,768,141 | * | 6/1998 | Hanaoka et al. ................. 364/478.02 |
| 5,956,301 | * | 9/1999 | Dimitri et al. .......................... 369/34 |
| 6,031,798 | * | 2/2000 | James et al. ............................ 369/34 |
| 6,038,490 | * | 3/2000 | Dimitri et al. ........................ 700/214 |
| 6,044,442 | * | 3/2000 | Jesionowski .......................... 711/153 |
| 6,044,444 | * | 3/2000 | Ofek ...................................... 711/162 |
| 6,185,165 | * | 2/2001 | Jesionowski et al. ................. 369/34 |

FOREIGN PATENT DOCUMENTS

| 0 276 967 A2 | 1/1988 | (EP) . |
| 0 458 567 A2 | 5/1991 | (EP) . |
| 0 578 918 A2 | 3/1993 | (EP) . |
| 0 645 693 A1 | 9/1994 | (EP) . |
| WO 96/06393 | 2/1996 | (WO) . |

OTHER PUBLICATIONS

Overland Data, Inc., L490/L490E SCSI Specification, Feb. 1995 (First Revision).
IBM Internatinal Technical Support Centers, IBM RAMAC Array Family, GG24–2509.00, Dec. 1994.
IBM International Technical Support Centers, A Practical Guide to the IBM 7135 RAID Array, SG24–2565.00, Jul. 1995.
IBM Technical Disclosure Bulletin, "Tape Array Storage System", vol. 36, No. 3, Mar. 1, 1993, pp. 369–370.

* cited by examiner

Primary Examiner—Thomas Lee
Assistant Examiner—Nguyen Tanh Q
(74) Attorney, Agent, or Firm—Knobbe Martens Olson & Bear

(57) ABSTRACT

A media element library defines a viral configuration different from the physical configuration of media and drives actually present in the library. A plurality of host computer systems communicate with the library as if they were communicating with a conventional library having a physical configuration identical to the virtual configuration defined by the library.

11 Claims, 8 Drawing Sheets

MEDIA ELEMENT LIBRARY WITH NON-OVERLAPPING SUBSET OF MEDIA ELEMENTS AND NON-OVERLAPPING SUBSET OF MEDIA ELEMENT DRIVES ACCESSIBLE TO FIRST HOST AND UNACCESSIBLE TO SECOND HOST

RELATED APPLICATIONS

This application is a continuation-in-part of U.S. application Ser. No. 08/786,702, also entitled "Virtual Media Library" and filed on Jan. 23, 1997 now abandoned. The disclosure of U.S. application Ser. No. 08/786,702 is hereby incorporated by reference in its entirety.

BACKGROUND OF THE INVENTION

The present invention relates to data processing systems and, more specifically, to automated data storage and retrieval systems which comprise a library of media elements as well as one or more drives for reading from and writing to the media elements in the library.

Magnetic tape cartridges, magnetic disks, and optical disks are all widely used as peripheral memory storage devices for computer systems. Large computer systems often operate in conjunction with external libraries having dozens of such media elements as well as the media element readers used to retrieve and record data. Although originally such media elements were selected and loaded manually, automated libraries were developed to expedite the handling of the media. These systems include means for accessing a desired media element, retrieving it from its storage position, and loading it into an appropriate reader. More recently, instruction sets have been created which define a communication protocol between the host computer system and the library. The instruction sets include commands to move media to different locations within the library and, of course, to load media into drives, place the media in a particular logical position, and read or write from and to specified regions of the media.

As data storage requirements for computer systems have increased front megabytes to gigabytes to terabytes, the development of automated media libraries has received considerable attention. Some embodiments of such libraries comprise a small number of media elements, six or ten being typical, and one or two drives housed in a single enclosure. Cabinet and even room sized systems have also been developed which hold a much larger number of media elements and drives, and which further comprise robotic arms, often translatable on all three axes, which remove media elements from storage and place them in drives. Furthermore, due to the increasing use of wide-area-networks, interconnected library systems forming a single dispersed database have become more common.

However, one problem with traditional library systems is that only one host computer may be effectively attached to a library at a time. This is a result of the fact that host computers attached to the library keep a log of the contents of the media contained in the library. If a second computer is attached to the same library, the second computer may modify the contents of the library which is being relied upon by the first computer. This poses a problem for network system administrators which prevents the use of cost effective large library systems. Typically, separate file servers in a network will have a dedicated small media library for use by the particular host file server. Data transfer requests from network clients must be routed to the library through the appropriate host. Data storage flexibility is thus reduced and data storage capacity is rendered more expensive because multiple physical libraries are required.

Accordingly, a need exists in the art for improvements in the distribution of data, storage capacity among a plurality of computers such as are present in a computer network.

SUMMARY OF THE INVENTION

In one embodiment, the invention comprises a media element library having at plurality of input-output interfaces, or alternatively a network interface, for communicating with a plurality of host computers. The library may comprise a plurality of media elements, wherein each media element is a member of one of a plurality of separate subsets of the plurality of media elements, and wherein each of the plurality of separate subsets is assigned for read/write access solely to a respective one of the plurality of host computers.

Methods of storing and retrieving data are also provided. In one embodiment, such a method comprises transparently allocating a first set of media element library resources to use by a first host computer and transparently allocating a second set of media element library resources to use by a second host computer. With this method, the first host computer and the second host computer may store and retrieve data to and from separate portions of the media element library without interfering with one another.

DETAILED DESCRIPTION OF THE PREFERRED EMBODIMENT

Preferred embodiment of the present invention will now be described with reference to the accompanying Figures, wherein like numerals refer to like elements throughout. The terminology used in the description presented herein is intended to be interpreted in its broadest reasonable manner, even though it is being utilized in conjunction with a detailed description of certain specific preferred embodiments of the present invention. This is further emphasized below with respect to some particular terms used herein. Any terminology intended to be interpreted by the reader in any restricted manner will be overtly and specifically defined as such in this specification.

Figure 1:
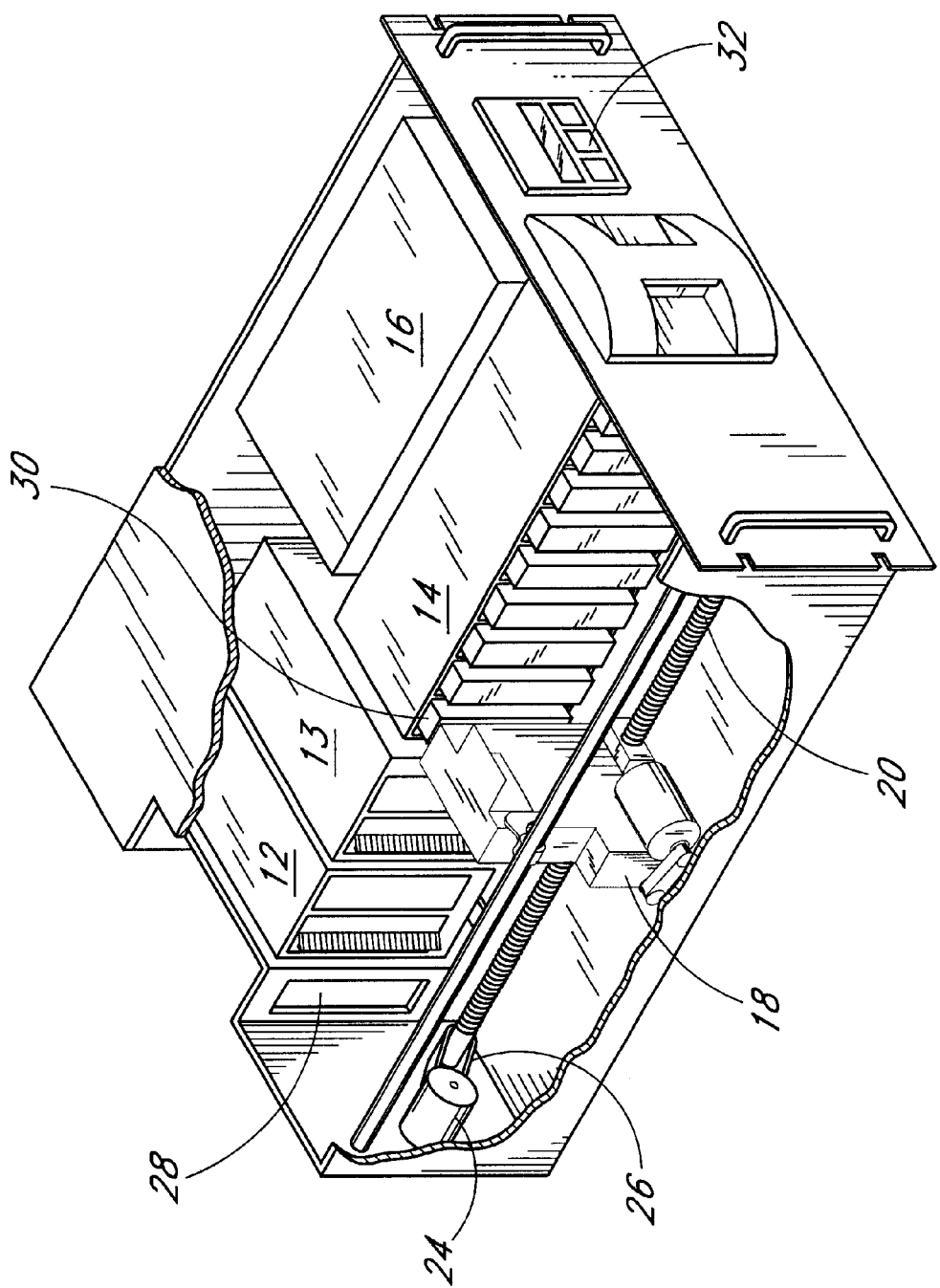
FIG. 1 is a cutaway perspective view of the physical layout of a magnetic tape library.

A cutaway view of an example tape cartridge library system is illustrated in FIG. 1. It will be appreciated, however, that as described briefly above, media libraries come in many forms, and include a wide array of media types such as optical disk as well as magnetic tape, and also include a variety of different numbers of drives, tapes, and robotic arms for media transportation. Such differences in media type and hardware configuration do not affect the applicability of the present invention to these diverse styles of library. Accordingly, the system described in conjunction with the following figures is exemplary only.

Referring now to FIG. 1, a cutaway perspective view of a preferred magnetic tape library system 10 incorporating two tape drives 12 and 13 and a tape storage magazine 14 is illustrated. Further provided inside library 10 is a power supply (not shown) as well as a library control module 16. The circuitry of the library control module 16 and its response to commands from an external host computer (not shown in FIG. 1) are described in more detail below with reference to FIGS. 3–7.

The library 10 also preferably includes a media transporter 18 which may be threadably secured to a drive shaft 20, which is in turn secured just above the floor of the library 10 in bearings on the front and rear panels. Lateral motion of the media transporter 18 is produced by a motor 24 which is secured to the inside of the library 10 housing, and which has a rotor coupled to the threaded drive shaft 20 by a drive belt 26. In a library configured as shown in FIG. 1, the media transporter moves back and forth along the drive shaft 20 so as to be adjacent to tape drive 12, tape drive 13, or any of the storage slots in the tape storage magazine 14. Overall operation of the library 10 proceeds as follows. Upon the receipt of commands from the library control module 16, the media transporter 18 is positioned in front of a particular tape cartridge 30 in the magazine 14. The media transporter 18 pulls the tape cartridge 30 from the magazine 14 into its own housing, and then travels toward the rear of the library 10.

When adjacent to the appropriate drive 12 or 13, the media transporter 18 pushes the tape cartridge 30 out of its housing and into the drive 12, 13. It can be appreciated that a variety of functions can be performed by the media transporter 18 in addition to loading a tape cartridge into a drive. For example, a tape cartridge could be moved to a different empty storage location in the magazine 14. In one preferable library embodiment, a pass through slot 28 is provided so that the media transporter 18 can eject tape cartridges out of the library 10. If desired, a second media transport device can be utilized to move such an expelled tape cartridge to another library. Other library configurations adapted for use with the present invention in addition to that shown in detail in FIG. 1 have been developed. For example, library systems are described in U.S. Pat. No. 5,285,333 to Barr, et al., U.S. Pat. No. 5,388,946 to Baur, U.S. Pat. No. 5,429,470 to Nicol et al., and U.S. Pat. No. 5,277,534 to Anderson et al. being several examples. The disclosures of each of these patents are hereby incorporated by reference in their entireties. It should also be kept in mind that libraries of other media types such as optical disks are also contemplated for use in conjunction with the present invention.

As will also be illustrated below, the media transporter 18 is under the direct control of the library control module 16.

The library control module 16 further receives commands from a host computer system which direct it to produce, in the library 10, action desired by the host system. In some embodiments of the library 10, the library control module 16 can also interface with users through a physical keypad/display unit 32.

Figure 2:
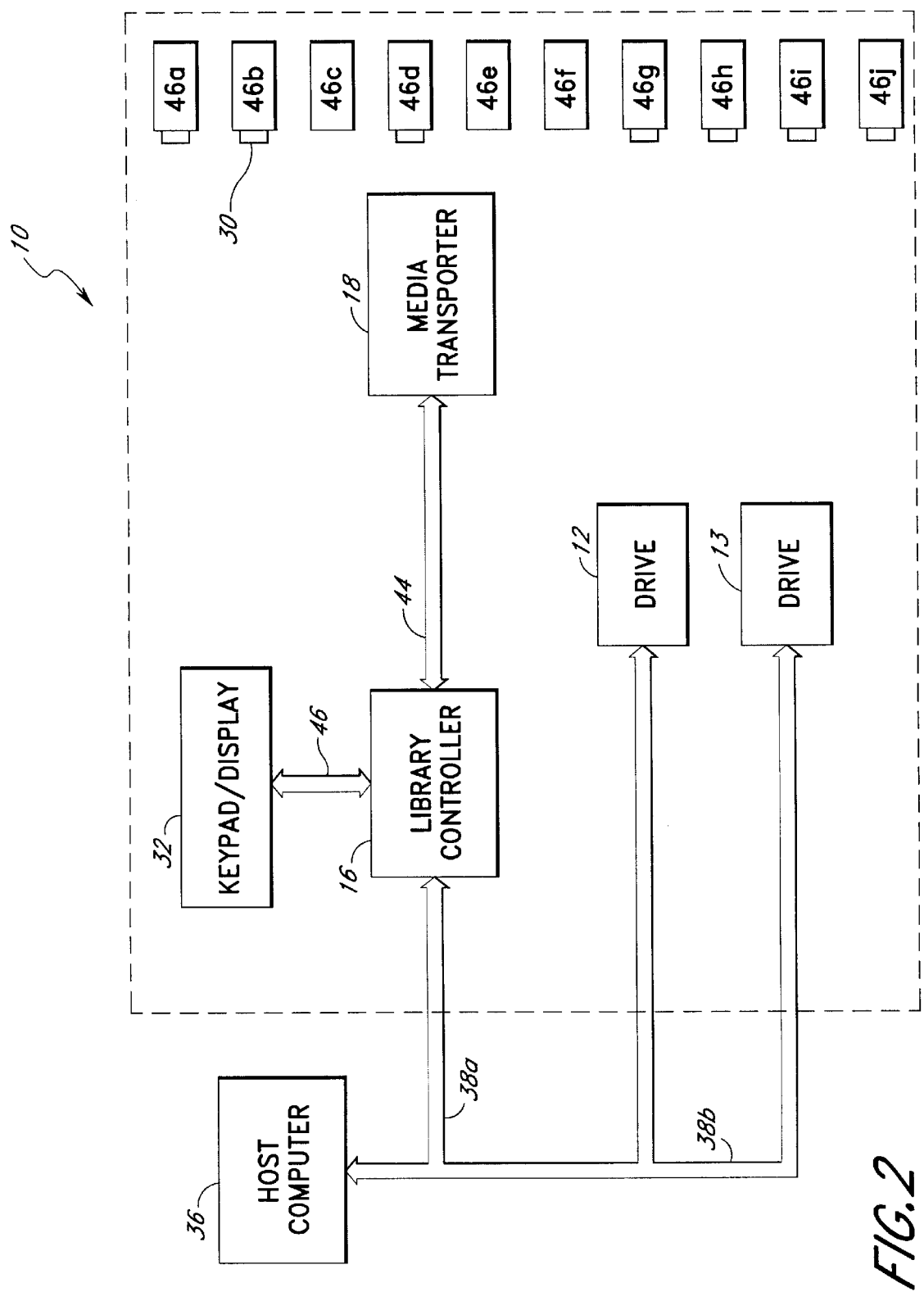
FIG. 2 is a block diagram of the interconnections between the components of the tape library of FIG. 1 and a host computer system.

FIG. 2 illustrates a library 10 interfaced to a single host computer 36 through a communication bus 38a coupled to the library control module 16, which may advantageously be of Small Computer System Interface (SCSI) format. The host computer system 36 may be a personal computer, a mainframe, a local area network server, or any of a wide variety of data processing apparatus well known to utilize media, libraries for data storage. The communication bus 38 connects to the library control module 16 inside the library 10 itself. As is further shown in FIG. 2, the library control, module 16 is also preferably interconnected to a keypad/display unit 32, for communicating a relatively limited set of commands and status messages between the control module 16 and a library user.

The host computer system 36 also communicates with each drive 12, 13 over a communication bus 38b. This communication bus 38b may also advantageously be of Small Computer System Interface (SCSI) format, and as illustrated in FIG. 2, may comprise the same SCSI bus as the bus 38a used to communicate with the library control module 16. The library control module also communicates with the media transporter 18 through another communication bus 44. Also illustrated in FIG. 2 are media storage locations 46a through 46j. In the illustrated example, storage locations 46c, e, and f are vacant, and the remainder house magnetic tape cartridges.

In normal operation, the library 10 receives commands from an application program such as an automated data backup program running on the host computer system 36. These commands are interpreted by the library control module 16, which then carries out the commands by returning status information to the host and by appropriately controlling the actions of the media transporter 18. As mentioned above, the library control module 16 may also interface with library users through a keypad/display unit 32 via another communication link 46. Simple commands such as a reset command and certain status messages may be relayed via this interface.

One aspect of the present invention is directed to the configuration of the library control module 16 and its responses to commands received from the host computer system 36. As is explained in detail below, a preferred media library 10 in accordance with the present invention will interpret and execute identical commands from the host computes system 36 in different ways depending upon how the library user configures the library control module 16. In an especially advantageous embodiment, this different command execution is transparent to the host computer 36. As the physical nature of the library is in, this way hidden from the host computer system 36, it may be stated that the host 36 is, interfacing with a "virtual library", which appears to have a particular configuration of tapes, drives, and data which is different from the actual physical configuration of tapes, drives, and data in the library 10.

Figure 3:
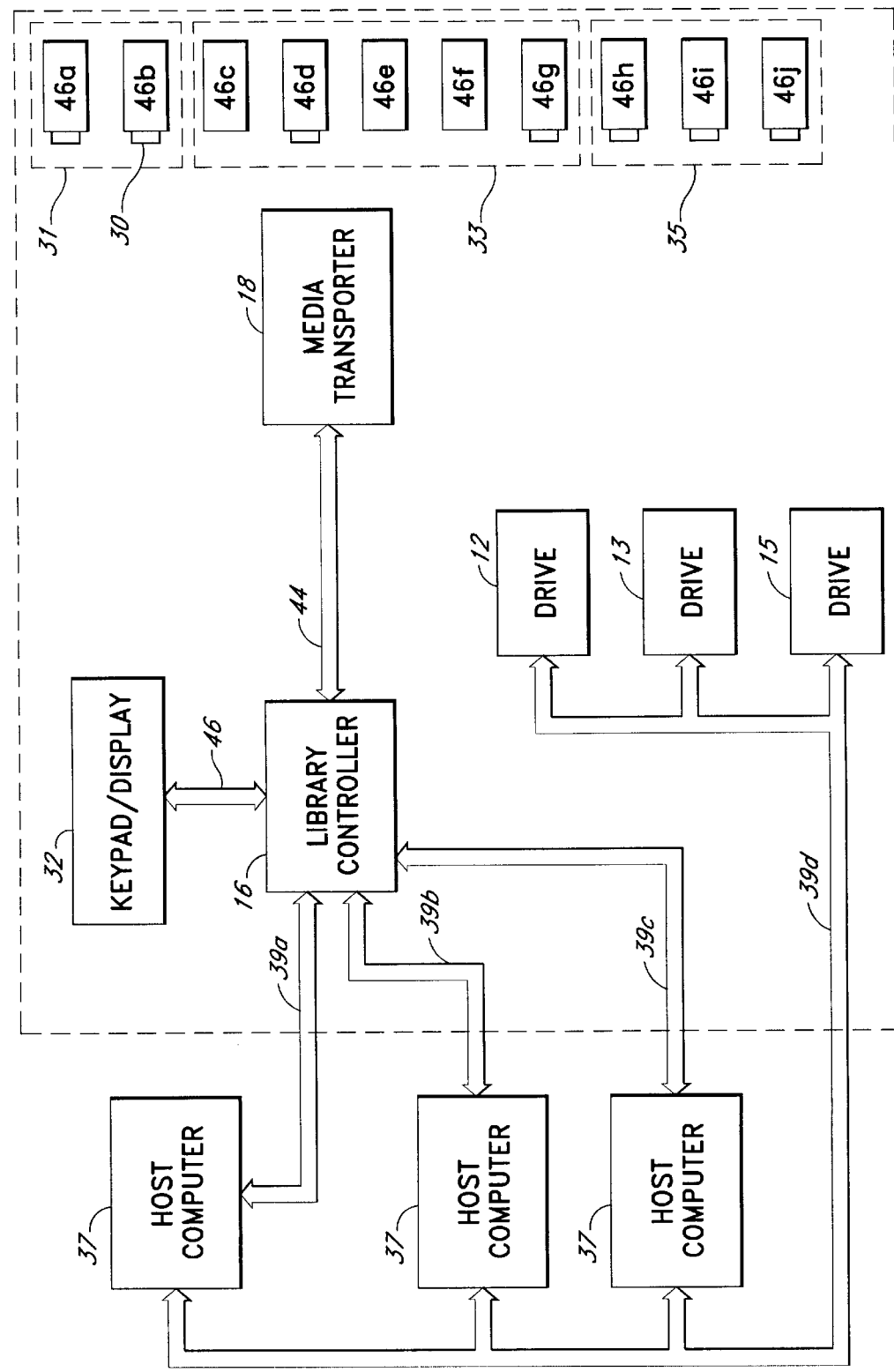
FIG. 3 is a block diagram of the interconnections between the components of a second embodiment of a data storage system.
Figure 4:
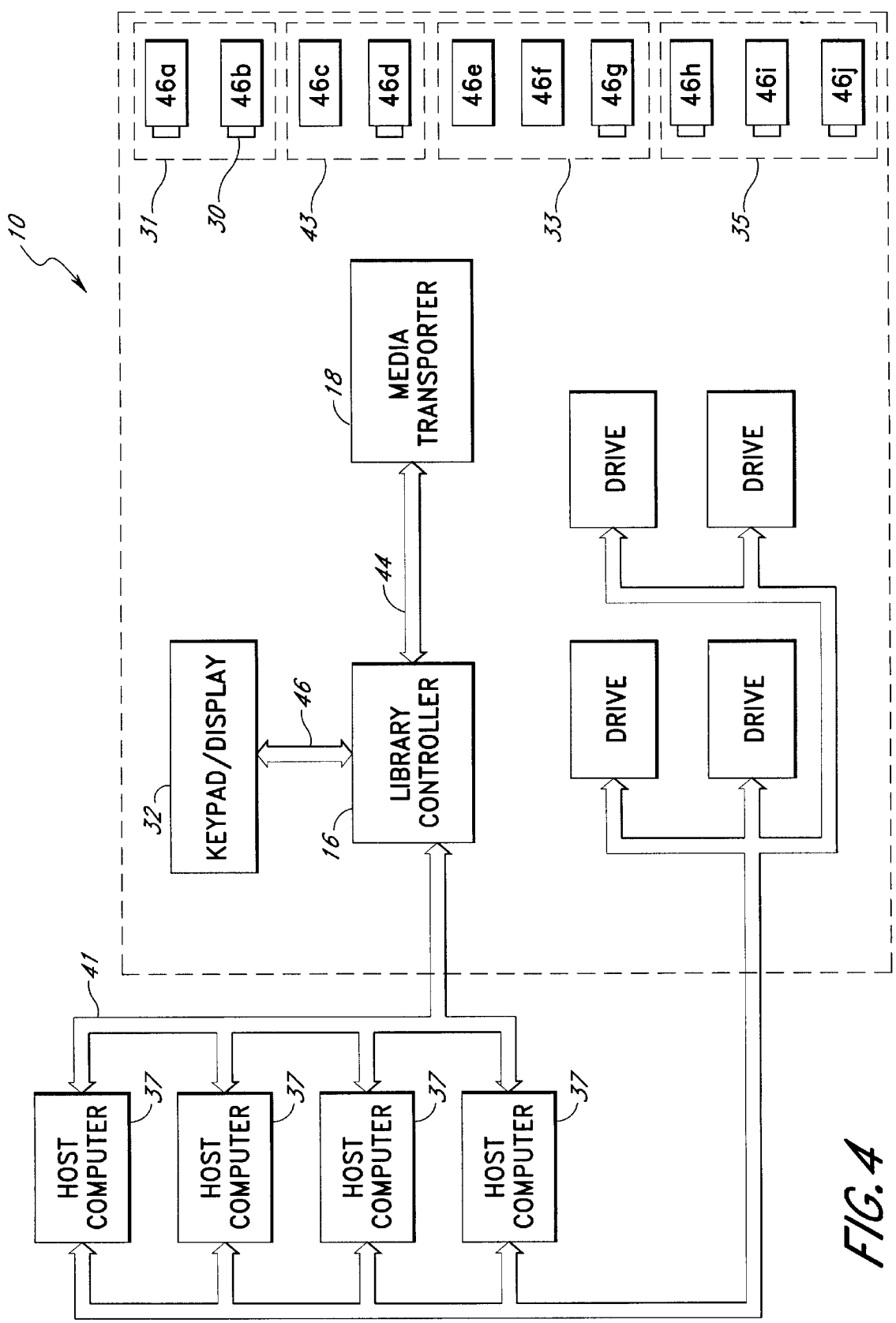
FIG. 4 is a block diagram of the interconnections between the components of a third embodiment of a data storage system.

FIGS. 3 and 4 illustrate two embodiments of the invention. FIG. 3 illustrates the library 10 connected to a plurality of host computers 37 wherein each of the plurality of host computes is allocated a subset of the total number of media storage locations 46a through 46j. FIG. 4 shows the library 10 connected to a plurality of host computers 39 through a network connection. Each of these three embodiments will be described in further detail below.

Referring now to FIG. 3, in a second embodiment a plurality of host computers 37 each have a communication bus 39a, 39b, 39c connected to the library controller 16. In the embodiment of FIG. 3, these communication busses are independent. They may, however, comprise a common bus such as a common SCSI bus. When a common SCSI bus is used, for example, library controller 16 response to commands issued by the different hosts 37 will vary depending on the SCSI ID of the host 37 which issued the command. In this embodiment, each of the media storage locations 46a through 46j are grouped into one of three sets 31, 33, and 35. Each of the sets 31, 33, 35 are allocated by the controller for use by one of the three host computers 37, respectively. As the controller allocates the storage locations among the host computers, each subset of the media elements 30 present in a given group of storage locations is available for read/write access to one of the host computers, but is unavailable for read/write access to the other host computers. Advantageously, the allocation is transparent to the separate hosts, effectively creating a plurality of "virtual libraries" which are independently used by each of the three host computers. In the specific embodiment of FIG. 3, set 31 has two media locations 46a and 46b. Set 33 has five media locations 46c through 46h, and set 35 has three media locations 46h through 46j.

The allocation of each of the storage locations 46a through 46j may be programmed into the controller 16 through the use of the keypad/display unit 32. Alternatively, the allocation of each of the storage locations may be implemented by sending appropriate configuration commands from one of the host computers 37 to the library control module 16. It may also be appreciated that the allocation of each the number of the media locations 46a through 46j may be dynamically altered depending on requirements of the host computers 37. For example, a system administrator may decide to remove the media locations 46c and 46d from set 33 and the add media locations 46c and 46d to set 31 by re-programming the controller's allocation of media. By allocating a subset of the media locations 46a through 46j for use by each of the host computers, the risk is eliminated that one of the host computers 37 will disadvantageously modify the data that is being relied won by one of the other host computers 37.

To further reduce the risk of conflict between the host computers 37, each of the drives 12, 13, and 15 present in the media library 10 may be reserved for read/write access by respective ones of the host computers 37. Preferably, there is at least one drive in the library per host computer 37. It will be appreciated that there may be additional drives, and these additional drives may also be allocated among the several hosts. For example, one host may be allowed access to a specific set of three drives, one to a set of two drives, and the remaining hosts to one drive each. Additionally, the library 10 may have a plurality of media transporters (not shown), wherein each of the plurality of robots is dedicated for use by one of the host computers 37. The drives are also connected to the host computers 37 via a communication bus 39d. This communication bus 39d also may comprise several independent busses, may be a single bus, or may be common to the bus 39a, 39b, 39c connecting the hosts 37 to the library control module 16.

Referring to FIG. 4, multiple host computers 37 are connected by a network 41 to a media element library 10. In this embodiment, therefore, the library itself comprises a network interface for direct communication with a plurality of hosts. Library controller 16 response to commands may vary with the IP address of the issuing host, for example, to again by create "virtual libraries" for each host. As with the embodiment described with reference to FIG. 3, different portions of the media locations 46a through 46j are allocated by the controller 16 for use by different host computers 37. The network 41 may include any type of electronically connected group of computers including, for instance, the following networks: Internet, Intranet, Local Area Networks (LAN) or Wide Area Networks (WAN). In addition, the connectivity to the network may be, for example, remote modem, Ethernet (EEE 802.3), Token Ring (IEEE 802.5), Fiber Distributed Datalink Interface (FDDI) or Asynchronous Transfer Mode (ATM). Note that computing devices may be desktop, server, portable, hand-held, set-top, or any other desired type of configuration.

Each of the host computers 37 includes a converter (not shown), which converts a media storage command from an application running on the respective host computer into a network command. The converter sends the network command over the network 41 to the library controller 16. By connecting the library 10 directly to a network 41, each of the host computers 37 need not have an individual connection to the library 10. In this embodiment, the controller 16 is configured to convert network commands into appropriate internal library commands (such as SCSI commands) which are used to control the media transporter 18 and the drives 12, 13.

In analogy with the embodiment of FIG. 3, virtual libraries are created by configuring the controller such that each of the host computers 37 have one of the sets of media element storage locations 31, 33, and 35, 43 transparently allocated for their respective use, thereby eliminating any conflict between the host computers 37 for the same media element. Similar to the allocation process for the embodiment of the invention shown in FIG. 3, the allocation of each of the storage locations 46a through 46j may be made through the use of the keypad/display unit 32. Alternatively, the assignment of each of the storage locations may be implemented by sending a command from one of the host computers to the library control module 16. Also as described above, the allocation of each of the media locations 46a through 46j may be dynamically altered depending on requirements of the host computers.

Figure 5:
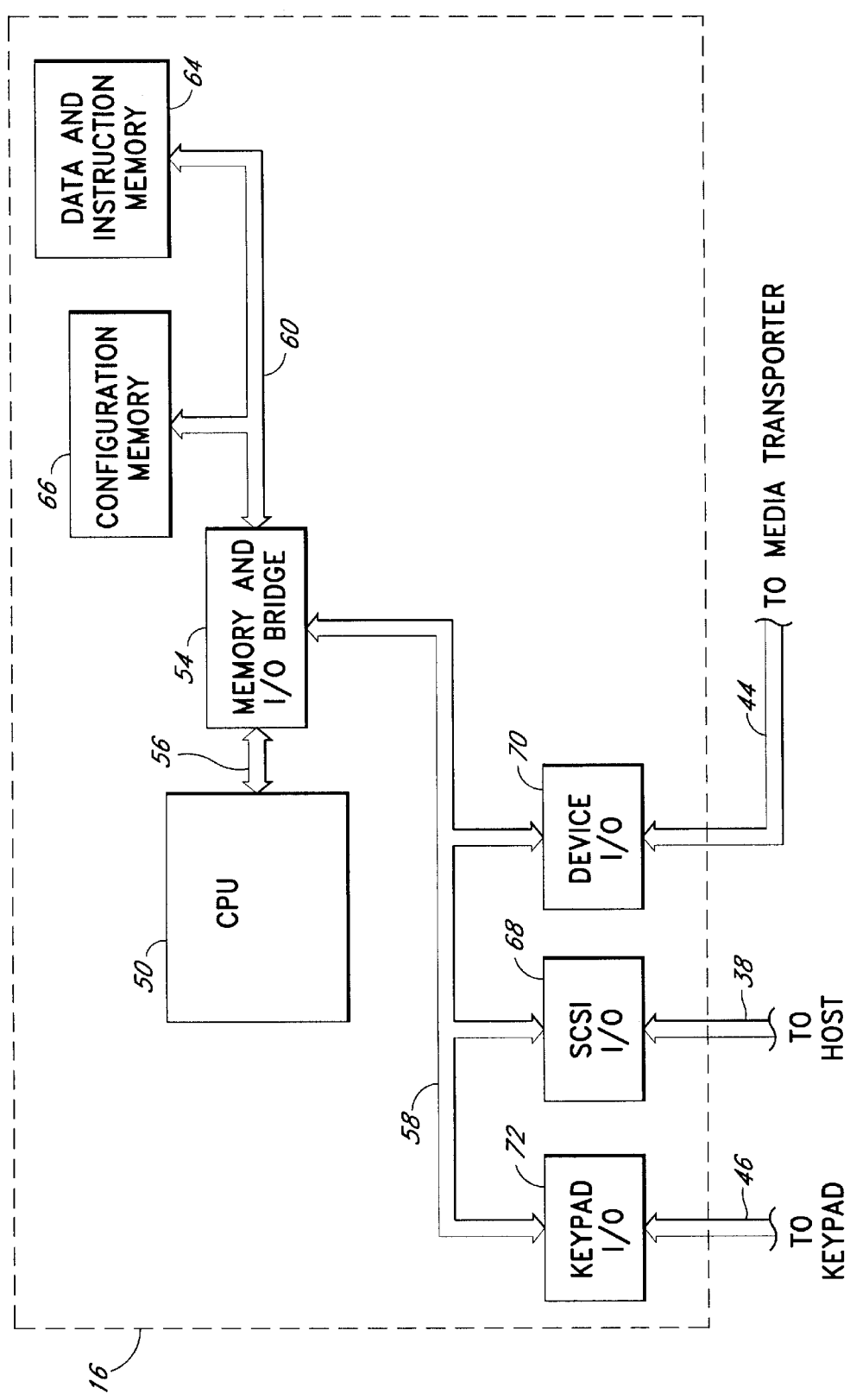
FIG. 5 is a block diagram of the library controller of FIG. 2.
Figure 6:
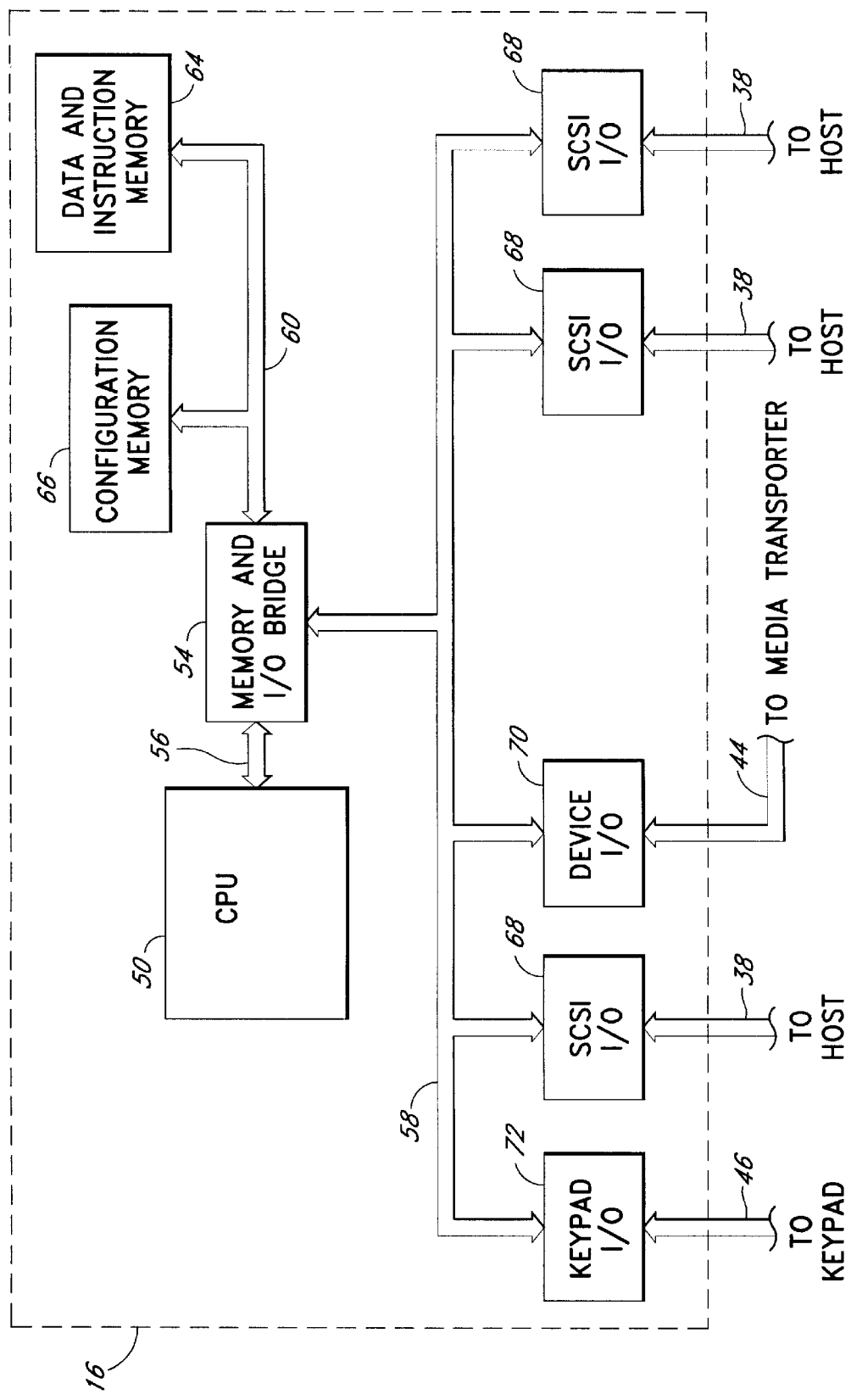
FIG. 6 is a block diagram of the library controller of FIG. 3.
Figure 7:
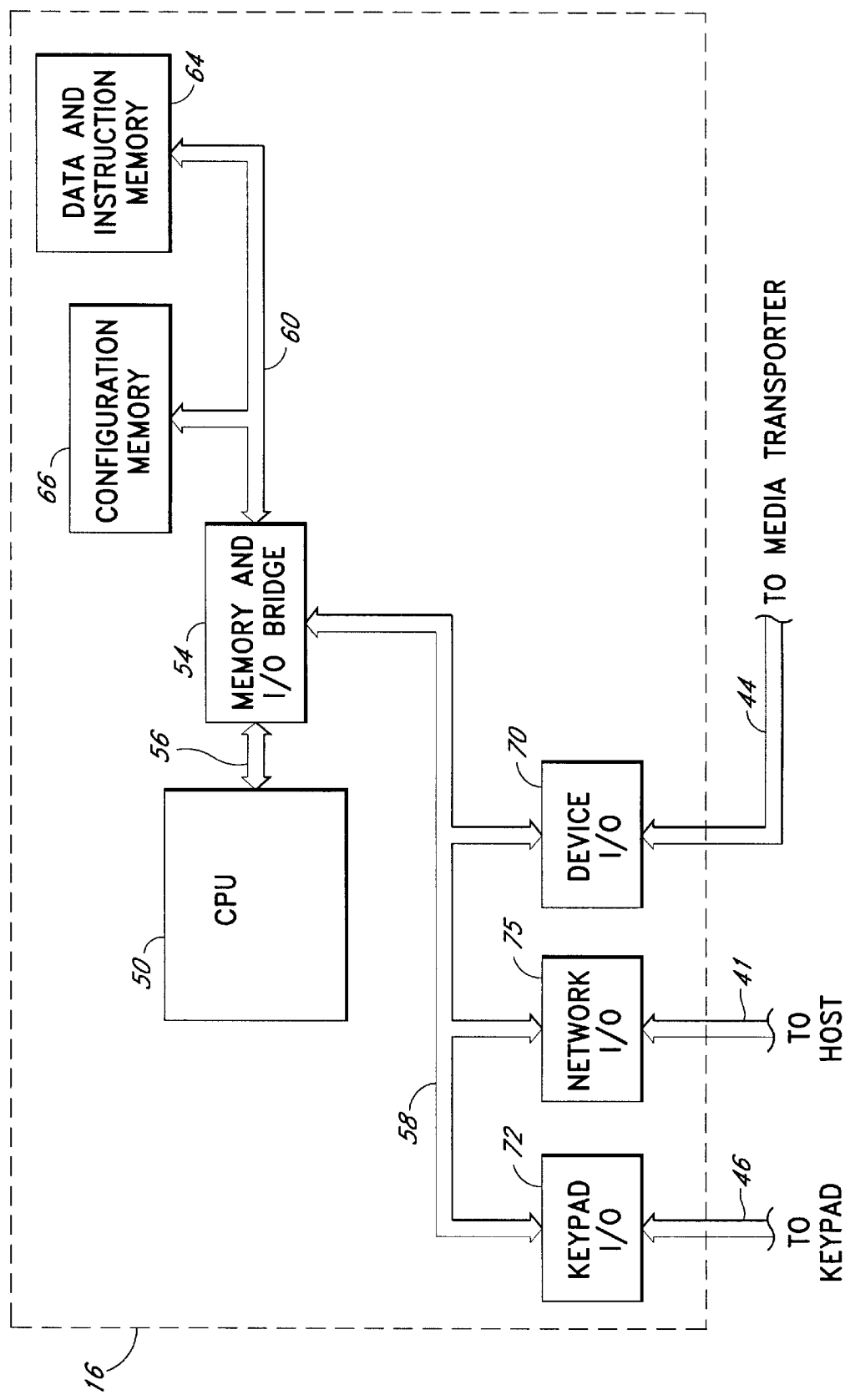
FIG. 7 is a block diagram of the library controller of FIG. 4.

Referring now to FIGS. 5, 6, and 7, the components of the library control module 16 are described below for each of the embodiments shown in FIGS. 2, 3 and 4, respectively. For each of these embodiments, the implementation of the virtual library is advantageously done inside the library control module 16.

Referring now to FIG. 5, the library control module 16 includes a microprocessor circuit 50, which may advantageously comprise an Intel 386, 486, or Pentium (TM) processor chip. The microprocessor 50 interfaces with a memory and I/O bridge 54 via a host bus 56. The memory and I/O bridge 54 in turn interfaces with an I/O bus 58 and a memory bus 60, and functions to buffer data and command transfers to and from the microprocessor 50. The memory and I/O controller 54 also create a direct memory access (DMA) channel between the I/O devices and the library control module mass memory 64.

In a preferred embodiment of the present invention, the memory of the library control module 16 comprises two portions, a data and instruction memory portion 64, and a configuration memory portion 66. The data and instruction memory stores instructions processed by the microprocessor 50. The library control module 16 also preferably comprises a configuration memory 66. The configuration memory is for storing information relating to the user defined "virtual" configuration of the library. In a preferred embodiment, the configuration memory 66 is non-volatile, comprising a battery, backed up RAM, EEPROM, flash memory, or other non-volatile memory device. This allows the library 10 to retain its virtual configuration information when the library is powered down.

The I/O bus 58 of the library control module 16 is connected to the host computer 36 through an industry standard SCSI interface circuit 68. The SCSI I/O circuit coordinates command and data flow between the host computer 36 and the microprocessor 50 of the library control module 16. The I/O bus 58 of the library control module 16 is also connected to a device I/O circuit 70 for interfacing with the media transporter 18 inside the library 10, and further is connected to a keypad I/O circuit 72 for interfacing with the front panel keypad 32.

In operation, the library control module 16 receives commands and data from the host computer system 36. In one preferred embodiment of the present invention, the commands issued by the host computer 36 are among the set of industry standard SCSI commands developed for host-library communication. These commands are interpreted by a program being run by the microprocessor 50, which controls the operations of the media transporter 18 in accordance with host commands. As mentioned above and explained in detail below with reference to FIGS. 8 through 10, it is one aspect of a preferred embodiment of the present invention that the commands received from the host computer 36 are interpreted and/or handled differently depending on the information stored in the configuration memory 66. It will be appreciated by those skilled in the art that various computer architectures could be utilized to produce the configuration dependent interpretation and execution of commands from the host computer system 36. Accordingly, the data flow illustrated in FIG. 3 is intended to be exemplary rather than limiting.

Referring now to FIG. 6, a second embodiment of the library is illustrated having multiple input-output interfaces for communication with a plurality of host computers. Thus, FIG. 6 illustrates some of the internal components of a library control module 16 suitable for use in the system shown in FIG. 3. The I/O bus 58 of FIG. 6 is connected to the host computers 37 through a plurality of, for example, industry standard SCSI interface circuits 68. As mentioned above with reference to FIG. 3, these communication busses could also be consolidated onto a single bus. Data flow and communication protocols may be analogous to that described above with reference to FIG. 5. In one application, the configuration memory 66 stores information which defines media element membership in subsets of available media elements which are allocated to specific host computers 37.

In FIG. 7, a third embodiment of the library control module 16 is illustrated which is suitable for use in the data storage system of FIG. 4. The I/O bus 58 of the library control module 16 shown in FIG. 7 includes a network interface port 75 for communicating with a plurality of host computers 39 through a computer network. The network circuit 75 coordinates command and data flow between the host computers 39 and the microprocessor 50 of the library control module 16. Similar to the other embodiments, the I/O bus 58 of FIG. 7 is also connected to a device I/O circuit 70 for interfacing with the media transporter 18 inside the library 10, and further is connected to a keypad I/O circuit 72 for interfacing with the front panel keypad 32. Once again, the configuration memory 66 may store information which defines media element membership in subsets of available media elements which are allocated to specific host computers 39.

The function of the library control module 16 and its processor 50 is the interpretation and execution of commands received from the host computer system 36 or multiple host computer systems 37, 39. For example, a host computer may instruct the library to move a media element from one storage location to another, or may instruct the library to read or write at a particular location on a media element In preferred embodiments of the present invention, as well as on many prior art library systems, these instructions are interpreted and carried out by a software program running on the library control module. In a SCSI interface implementation of a library, as in one example described herein, such commands issued by a host computer system are defined by a standard library command set defined by industry convention. Although commands to the library 10 from a host computer may be of any format as long as the library 10 is designed and programmed to understand the commands being issued by the host, the industry standard SCSI host-library communication protocol is used herein as an example of one embodiment of the present invention.

Figure 8:
FIG. 8 is an illustration of an industry standard format for a library status request command issued by a host computer.

Referring now to FIG. 8, several of the significant features of the SCSI command referred to as a "read element status" command are illustrated. When this command is issued by a host computer 36 to the library 10, the library 10 returns information to the host computer regarding the library configuration including the number of media elements, drives, and robots. This command is comprised of several important portions. First, an opcode field 80 assigned to this instruction, and second a series of parameters for informing the library 10 what status information a given host computer 36, 37, 39 wish to receive. The parameters include (1) an element type field 82, which indicates what type of element, i.e. media elements, drives, and/or robots, should be reported on by the library 10, (2) an element starting address 84, indicating the lowest address of the specified element type which should be reported by the library 10. The command also includes additional parameters such as an allocation length field, specifying how much memory has been allocated by the host for data received from the library 10 in response to the command.

Figure 9A:
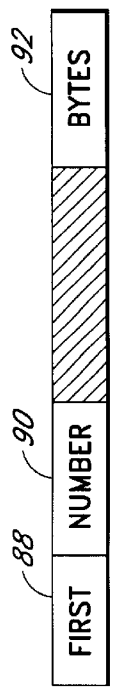
FIG. 9A is an illustration of an industry standard format for the header portion of a library response to the status request command of FIG. 4.
Figure 9B:
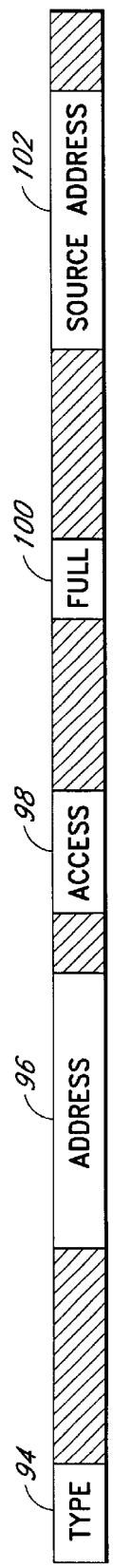
FIG. 9B is an illustration of an industry standard format for a data portion of a library response to the status request command of FIG. 4.

The standard format response to one particular read element status command requesting status information regarding the media element storage slots is illustrated in FIGS. 9a and 9b. The response comprises an eight byte header illustrated in FIG. 9a, followed by several twenty-six byte storage element status pages, one for each storage slot being reported. Referring now to FIG. 9b, the header comprises information concerning the first element address reported 88, the number of elements being reported 90, and the total number of bytes of information 92 of available status information regarding the media element storage locations.

FIG. 9a illustrates the content of each returned status page containing information regarding the media element storage slots reported by the library 10. The information in the status page includes (1) an element type code 94, which in this instance would be the element type code assigned to media element storage slots, (2) the address of the storage slot 96 being reported in this particular status page, (3) an access bit 98 indicating whether or not the media transporter 18 is allowed access to this slot, (4) a full bit 100, indicating whether or not a media element such as a tape cartridge is contained in the slot, and (5) a source address field 102, indicating the address which last contained the media element currently stored in the slot being reported.

It can be appreciated that a conventional library will respond to the read element status command of FIG. 8 with information concerning the physical configuration of the library. For example, a read element status command could request information concerning any one or all of the of drives, storage slots, or robots in a media library. As seen above, a conventional library response would include the total number and addresses of the elements requested, the presence or absence of media elements in storage slots, as well as other information about the library 10, and this information would correspond directly to the physical configuration of the library 10. Other host commands which are issued to a library also fit this paradigm.

Figure 10:
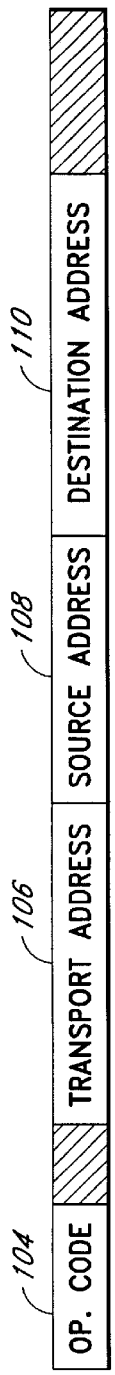
FIG. 10 is an illustration of an industry standard format for a move medium request issued by a host computer.

In FIG. 10, for example, the format of the "move media" command is illustrated. This command includes an opcode field 104, and additionally includes (1) the address 106 of the robot to be used to perform the transfer, (2) the current address 106 of the media element to be moved, and (3) the destination address 110 that the media element is to be moved to. In a conventional library 10, each storage slot is assigned an address, and accordingly, this command causes the transfer of one media element from a first defined physical location to a second defined physical location. There is, therefore, a direct correspondence between command parameters such as storage slot addresses and the physical configuration of the library 10.

In the preferred library 10 of the present invention however, the correspondence between addressed elements and action taken by the library 10 can vary such that the host computers 36, 37, 39 send commands based on a virtual library configuration that is different from the physical configuration actually present.

Such an interface to a virtual library can improve library performance characteristics as seen by the host computers 36, 37, 39 without complicating the set-up, maintenance, or creation of application software utilizing the library 10 as a data storage device. Data storage system flexibility may therefore be enhanced by allowing a plurality of host computers to each interface to a virtual library comprising a subset of physical library resources. By making the resource allocation being utilized by the library 10 transparent to the host computer system or systems, however, the library's response to host commands must be altered, and must further be altered in different ways depending on the host computer issuing the command.

When the controller is configured to simultaneously communicate with a plurality of hosts, groups of media elements may be allocated for use by only one of the plurality of hosts. Also, individual ones or specific groups of drives may also be allocated for use by only one of the plurality of hosts. The library response to a read element status command will thus differ depending on the host which issued the command. The response will only include those library resources which are available to that particular host. With respect to, for example, the move media and write commands of FIGS. 10 and 11, the controller may remap source and destination addresses from the virtual configuration seen by the host to the appropriate physical resources allocated to that host.

Another function performed by the controller in multi-host mode is the queuing and prioritization of commands received from the plurality of host computers. When the library receives commands from other hosts before completing a command from a first host, the additional commands are queued in a memory in the controller. The commands may then be sequentially performed either in the order received, or in a different order if library efficiency of operation may be improved by promoting some commands above others in the queue.

It can be appreciated from the foregoing that a preferred media library according to the present invention is user configurable for various combinations of fault tolerance and data transfer performance while retaining an appearance to a host computer system as a conventional media library. The implementation of such fault tolerance and data transfer enhancements requires no modification of application software running on the host system 36. The actual user configuration of the library 10 can occur in several ways. In a preferred media library, the keypad interface 18 allows library 10 configuration via the keypad. Most preferably, the user can scroll through and choose from a list of pre-defined configuration options, or define their own from scratch through the keypad interface. Alternatively, a second SCSI, RS232, or other communication interface can be provided on the library which is dedicated to interfacing with a PC or other computing device which is independent from the host The PC would run software which would download configuration parameters to the library. As another alternative, a software program which can be run on the host system is used to load the configuration memory 66 with the desired parameters via SCSI communication with the library. This last alternative, however, may require the generation of several separate host configuration control programs which are compatible with different host library control programs being used at different library installations.

The foregoing description details certain preferred embodiments of the present invention and describes the best mode contemplated. It will be appreciated, however, that no matter how detailed the foregoing appears in text the invention can be practiced in many ways. Details of the library status reporting to the host may vary considerably in its details, while remaining within the spirit and scope of the invention disclosed herein. As is also stated above, it should be noted that the use of particular terminology when describing certain features or aspects of the present invention should not be taken to imply that the broadest reasonable meaning of such terminology is not intended, or that the terminology is being re-defined herein to be restricted to including any specific characteristics of the features or aspects of the invention with which that terminology is associated. The scope of the present invention should therefore be construed in accordance with the appended Claims and any equivalents thereof.

What is claimed is:

1. A data storage system comprising:

a plurality of media element drives;

a plurality of media elements, all of which are readable in each of said plurality of media element drives;

a plurality of media element storage locations;

a moveable carriage adapted to transport media elements from at least one of said media element storage locations to at least one of said media element drives;

a plurality of host computers; and a controller coupled to said plurality of media element drives, said moveable carriage, and said plurality of host computers, wherein said controller is configured such that a subset of said plurality of media elements and a subset of said plurality of media element drives are available for read/write access by a first one of said plurality of host computers and are unavailable for read/write access by a second one of said plurality of host computers.

2. In a media element library, a method of executing a plurality of data manipulation commands comprising:

pre-allocating subsets of media elements present in said media element library to servicing requests from respective ones of a plurality of host computers so that no subset contains the same media element as another subset;

pre-allocating subsets of media element drives present in said media element library to servicing requests from respective ones of said plurality of host computers so that no subset contains the same media element drive as another subset;

wherein all media elements are readable in each of said media element drives;

wherein a subset of said media elements and a subset of said media element drives are available for read/write access by a first one of said plurality of host computers and are unavailable for read/write access by a second one of said plurality of host computers;

receiving a plurality of data manipulation commands from said plurality of host computers coupled to said media element library;

queuing said plurality of data manipulation commands in a memory of said media element library; and sequentially performing said data manipulation commands.

3. The data storage system of claim 1, additionally comprising a user configurable memory storing data defining said controller's response to commands from said plurality of host computers such that said subset of said plurality of media elements and said subset of said plurality of media element drives is user selected.

4. The data storage system of claim 1, wherein said controller comprises a network interface routed to each one of said plurality of host computers.

5. The data storage system of claim 4, wherein the network interface has a Token Ring or Ethernet connector for connecting to the plurality of computers.

6. The data storage system of claim 1, wherein said controller comprises an input-output interface for coupling to said plurality of host computers.

7. The data storage system of claim 1, wherein said controller comprises a plurality of input-output interfaces for coupling to respective ones of said plurality of host computers.

8. The data storage system of claim 7, wherein said input-output interfaces comprise SCSI interfaces.

9. The data storage system of claim 1, wherein said media elements comprise magnetic tape cartridges.

10. A method of communicating information between a host computer system and a data storage library, said method comprising the steps of:

dividing a plurality of media storage locations into a first plurality of portions, wherein each of a plurality of host computers is associated with a separate one of said first plurality of portions;

dividing a plurality of media element drives into a second plurality of portions, wherein each of the plurality of host computers is associated with a separate one of said second plurality of portions of media element drives;

sending a first request for information regarding the number of media element storage locations in said library from one of the plurality of host computers to the library;

sending a second request for information regarding the number of media element drives in said library from said one of the plurality of host computers to the library;

sending a response to said first request from said library to said one of the plurality of host computers, said response including only the number of media element storage locations in the portion of the first plurality of portions associated with said one of the plurality of host computers; and sending a response to said second request from said library to said one of the plurality of host computers, said response including only the number of media element drives in the portion of the second plurality of portions associated with said one of the plurality of host computers, whereby said one of the plurality of host computers sees only its associated portion of the media storage locations and its associated portion of the media element drives, and whereby the media element storage locations in said one of said fist plurality of portions and the media element drives in said one of said second plurality of portions associated with said one of said plurality of host computers are available for read/write access by said one of said plurality of host computers are unavailable for read/write access by an another one of said plurality of host computers.

11. The method of claim 10, wherein the act of sending a request and the act of sending a response, includes the act of sending a request and sending a response over a computer network.

* * * * *

UNITED STATES PATENT AND TRADEMARK OFFICE
CERTIFICATE OF CORRECTION

PATENT NO. : 6,328,766 B1
DATED : December 11, 2001
INVENTOR(S) : Robert M. Long It is certified that error appears in the above-identified patent and that said Letters Patent is hereby corrected as shown below:

Column 1,
Line 41, please delete "front" and insert therefore, -- from. --

Column 5,
Line 45, please delete "won" and insert therefore, -- upon. --

Column 6,
Line 3, please delete "again by" and insert therefore -- again transparently. --

Signed and Sealed this

Twenty-second Day of July, 2003

JAMES E. ROGAN
*Director of the United States Patent and Trademark Office*